(12) United States Patent
Chang et al.

(10) Patent No.: US 9,571,016 B2
(45) Date of Patent: Feb. 14, 2017

(54) MOTOR CONTROL SYSTEM AND METHOD

(71) Applicant: DELTA ELECTRONICS, INC., Taoyuan Hsien (TW)

(72) Inventors: Chia-Hao Chang, Taoyuan Hsien (TW); Yueh-Lung Huang, Taoyuan Hsien (TW); Yen-Hung Chen, Taoyuan Hsien (TW); Shih-Yuan Chiang, Taoyuan Hsien (TW); Feng-Ying Lin, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 122 days.

(21) Appl. No.: 14/330,813

(22) Filed: Jul. 14, 2014

(65) Prior Publication Data
US 2015/0048769 A1 Feb. 19, 2015

(30) Foreign Application Priority Data

Aug. 16, 2013 (CN) .......................... 2013 1 0359324

(51) Int. Cl.
*H02P 1/30* (2006.01)
*H02P 1/04* (2006.01)
*H02P 6/08* (2016.01)
*H02P 31/00* (2006.01)

(52) U.S. Cl.
CPC ............. *H02P 6/08* (2013.01); *H02P 29/0241* (2016.02); *H02P 31/00* (2013.01)

(58) Field of Classification Search
CPC ........... H02P 29/00; H02P 29/024; H02P 6/08; H02P 27/08; H02P 7/29; H02P 6/008; H02P 6/002; H02P 31/00; H02P 29/0241

USPC .............................................. 318/503, 400.09
See application file for complete search history.

(56) References Cited

U.S. PATENT DOCUMENTS 8,080,963 B2    12/2011  Wu et al.
2006/0214616 A1*  9/2006  Shen ........................ G06F 1/206
                                                            318/400.21
2014/0084823 A1*  3/2014  Lee .......................... H02P 31/00
                                                            318/400.09

FOREIGN PATENT DOCUMENTS

CN      1581671       2/2005
JP      2008-039103   2/2008
TW      I297565       6/2008

* cited by examiner

*Primary Examiner* — Bentsu Ro
*Assistant Examiner* — Zemenay Truneh
(74) *Attorney, Agent, or Firm* — Hauptman Ham, LLP

(57) ABSTRACT

A motor control system is disclosed. The motor control system includes a level-shifting unit, a motor unit and a control unit. The level-shifting unit receives an original pulse width modulation (PWM) signal to generate an output PWM signal. When a first high level of the original PWM signal is larger than a first reference value, the level-shifting unit shifts a second high level of the output PWM signal to a set high level. When a first low level of the original PWM signal is lower than a second reference value, the level-shifting unit shifts a second low level of the output PWM signal to a set low level. The control unit controls the speed of the motor according to the output PWM signal.

12 Claims, 4 Drawing Sheets

MOTOR CONTROL SYSTEM AND METHOD

RELATED APPLICATIONS

This application claims priority to China Application Serial Number 201310359324.X, filed Aug. 16, 2013, which is herein incorporated by reference.

BACKGROUND

Field of Invention

The present invention relates to motor control technology. More particularly, the present invention relates to a motor control system and a method thereof.

Description of Related Art

Motors have a wide range of uses in our daily lives. For instance, the fan utilized in motherboards, computer casings and projectors, etc. for improving heat dissipation is usually driven by motors. Motors are also often seen in small home appliances such as blenders and in various toys such as robots.

In various motor applications, the technique of pulse width modulation (PWM) is used to adjust the magnitude in the current of a motor in order to save power and control the speed of the motor. The technique of PWM involves adjusting a ratio of a power-transmitting time and a non-transmitting time within a period of a square wave, in which a power supply transmits power to a load in the power-transmitting time. The proportion of the power-transmitting time with respect to the length of the square wave is also known as duty cycle. However, a conventional control unit that controls the speed of the motor usually identifies certain forms of high/low levels only. If a PWM unit for generating the square wave generates the forms of high/low level that the control unit cannot recognize due to process variations or other design factors, the control unit cannot control the motor in an appropriate manner.

Therefore, what is needed is a new motor control system and a control method thereof for addressing the issues mentioned above.

SUMMARY

The present invention provides a motor control system. The motor control system includes a level-shifting unit, a motor unit and a control unit. The level-shifting unit receives an original pulse width modulation (PWM) signal, so as to generate an output PWM signal. The level-shifting unit shifts a second high level of the output PWM signal to a set high level when a first high level of the original PWM signal is larger than a first reference value, and shifts a second low level of the output PWM signal to a set low level when a first low level of the original PWM signal is lower than a second reference value. The control unit controls a speed of the motor unit according to the output PWM signal.

In accordance with one embodiment of the present invention, the level-shifting unit includes a Zener diode and a switch transistor. The Zener diode includes an anode and a cathode. The cathode receives the original PWM signal. The switch transistor includes a voltage control terminal, a first terminal and a second terminal. The voltage control terminal is electrically connected to the anode. The first terminal is electrically connected to a first voltage source having the set high level and an output terminal. The output terminal generates the output PWM signal. The second terminal is electrically connected to a second voltage source having the set low level.

In accordance with yet another embodiment of the present invention, the first reference value is a sum of a first forward voltage of the Zener diode and a second forward voltage of the switch transistor. The second reference value is the first forward voltage. The Zener diode and the switch transistor are turned on to output the set low level at the output terminal when the first high level of the original PWM signal is larger than the first reference value. The switch transistor is turned off to output the set high level at the output terminal when the first low level of the original PWM signal is lower than the second reference value.

In accordance with yet another embodiment of the present invention, the original PWM signal and the output PWM signal have invert phases.

In accordance with yet another embodiment of the present invention, the level-shifting unit includes a comparator electrically connected to a first voltage source having the set high level and a second voltage source having the set low level. The comparator compares the original PWM signal with a voltage having the first reference value and the second reference value, so as to output the output PWM signal having the set high level when the original PWM signal is larger than the first reference value, and output the output PWM signal having the set low level when the original PWM signal is lower than the second reference value.

In accordance with yet another embodiment of the present invention, the original PWM signal and the output PWM signal are in-phase.

In accordance with yet another embodiment of the present invention, the level-shifting unit includes a reset circuit. The reset circuit receives the original PWM signal, so as to bypass the original PWM signal when the original PWM signal is larger than the first reference value, and generate a low reset level when the original PWM signal is lower than the second reference value.

In accordance with yet another embodiment of the present invention, the reset circuit outputs the output PWM signal directly. The first high level of the bypassed original PWM signal is the set high level of the output PWM signal, and the low reset level is the set low level of the output PWM signal.

In accordance with yet another embodiment of the present invention, the level-shifting unit further includes a switch transistor. The switch transistor includes a voltage control terminal, a first terminal and a second terminal. The voltage control terminal is electrically connected to the reset circuit. The first terminal is electrically connected to a first voltage source having the set high level and an output terminal. The output terminal generates the output PWM signal. The second terminal is electrically connected to a second voltage source having the set low level.

In accordance with yet another embodiment of the present invention, the switch transistor is turned on for the output terminal to output the set low level when the reset circuit bypasses the original PWM signal. The switch transistor is turned off for the output terminal to output the set high level when the reset circuit generates the low reset level.

In accordance with yet another embodiment of the present invention, the original PWM signal and the output PWM signal have invert phases.

The present invention also provides a motor control method for a motor control system. The motor control method includes the steps outlined below. An original pulse width modulation (PWM) signal is received. A determination is made as to whether a first high level of the original PWM signal is larger than a first reference value and whether a first low level of the original PWM signal is lower than a second reference value are determined. An output PWM signal is generated, wherein a first high level of the output PWM signal is shifted to a set high level when a first high level of the original PWM signal is larger than the first reference value, and a second low level of the output PWM signal is shifted to a set low level when the first low level of the original PWM signal is lower than the second reference value. A speed of a motor unit of the motor control system is controlled according to the output PWM signal.

In accordance with another embodiment of the present invention, the motor control method further includes the steps outlined below. The original PWM signal is received by a Zener diode, wherein the Zener diode is electrically connected to a switch transistor, and the switch transistor is electrically connected to a first voltage source having the set high level and a second voltage source having the set low level. The Zener diode and the switch transistor are turned on such that an output terminal of the switch transistor is electrically connected to the second voltage source and the output PWM signal having the set low level is outputted by the switch transistor when the first high level of the original PWM signal is larger than a sum of a first forward voltage of the Zener diode and a second forward voltage of the switch transistor. The switch transistor is turned off such that the output terminal receives a voltage of the first voltage source and the switch transistor outputs the output PWM signal having the set high level when the first low level of the original PWM signal is lower than the first forward voltage of the Zener diode.

In accordance with yet another embodiment of the present invention, the original PWM signal and the output PWM signal have invert phases.

In accordance with yet another embodiment of the present invention, the motor control method further includes the steps outlined below. The original PWM signal is received by a comparator, wherein the comparator is electrically connected to a first voltage source having the set high level and a second voltage source having the set low level. The original PWM signal is compared to a voltage having the first reference value and the second reference value by the comparator. The output PWM signal having the set high level is outputted by the comparator when the original PWM signal is larger than the first reference value. The output PWM signal having the set low level is outputted by the comparator when the original PWM signal is lower than the second reference value.

In accordance with yet another embodiment of the present invention, the original PWM signal and the output PWM signal are in-phase.

In accordance with yet another embodiment of the present invention, the motor control method further includes the steps outlined below. The original PWM signal is received by a reset circuit. The original PWM signal is bypassed by the reset circuit when the original PWM signal is larger than the first reference value. A low reset level is generated by the reset circuit when the original PWM signal is lower than the second reference value.

In accordance with yet another embodiment of the present invention, the reset circuit outputs the output PWM signal directly. The first high level of the bypassed original PWM signal is the set high level of the output PWM signal. The low reset level is the set low level of the output PWM signal.

In accordance with yet another embodiment of the present invention, the reset circuit is further electrically connected to a switch transistor. The switch transistor is further electrically connected to a first voltage source having the set high level and a second voltage source having the set low level. The motor control method further includes the steps outlined below. The switch transistor is turned on such that an output terminal of the switch transistor is electrically connected to the second voltage source and output the output PWM signal having the set low level when the reset circuit bypasses the original PWM signal. The switch transistor is turned off such that the output terminal receives a voltage of the first voltage source, and the switch transistor outputs the output PWM signal having the set high level when the reset circuit generates the low reset level.

In accordance with yet another embodiment of the present invention, the original PWM signal and the output PWM signal have invert phases.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
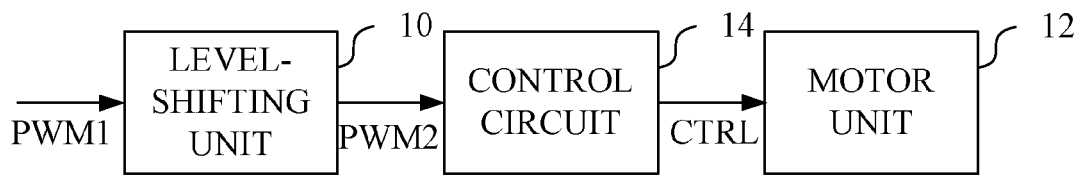
FIG. 1 is a block diagram illustrating a motor control system according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a block diagram illustrating a motor control system 1 according to an embodiment of the present invention. The motor control system 1 includes a level-shifting unit 10, a motor unit 12 and a control unit 14.

The level-shifting unit 10 receives an original pulse width modulation (PWM) signal PWM1 for shifting high/low levels of the original PWM signal PWM1 to generate an output PWM signal PWM2.

In different embodiments, the control unit 14 includes a motor driving circuit, a micro-control unit, a speed detecting unit, a speed control unit or a combination of these elements.

The control unit 14 generates a control signal CTRL to control the speed of the motor unit 12 according to a waveform of the output PWM signal PWM2 generated. For instance, the control unit 14 can control the speed of the motor unit 12 according to a duty cycle of the waveform of the output PWM signal PWM2.

The original PWM signal PWM1 can be generated by a PWM unit (not illustrated) electrically connected to the level-shifting unit 10. The original PWM signal PWM1 may have high/low levels that the control unit 14 cannot recognize due to process variations or design factors. If the original PWM signal PWM1 were transmitted to the control unit 14 directly, the control unit 14 would be unable to control the motor unit 12 in an appropriate manner since the control unit 14 cannot recognize the original PWM signal PWM1.

After being shifted by the level-shifting unit 10, high/low levels of the output PWM signal PWM2 are in a form that can be recognized by the control unit 14. In the present embodiment, when a high level of the original PWM signal PWM1 is larger than a first reference value Vref1, the level-shifting unit 10 shifts a high level of the output PWM signal PWM2 to a set high level Vset_h. When a low level of the original PWM signal PWM1 is lower than a second reference value Vref2, the level-shifting unit 10 shifts a low level of the output PWM signal PWM2 to a set low level Vset_l. The set high level Vset_h and the set low level Vset_l are recognizable by the control unit 14.

It is noted that in an embodiment, the levels mentioned above are voltage levels. Further, in an embodiment, the first reference value Vref1 and the second reference value Vref2 can be set such that the high level or the low level of the original PWM signal PWM1 is not between the first reference value Vref1 and the second reference value Vref2, thereby preventing the level-shifting unit 10 from operating incorrectly.

Figure 2A:
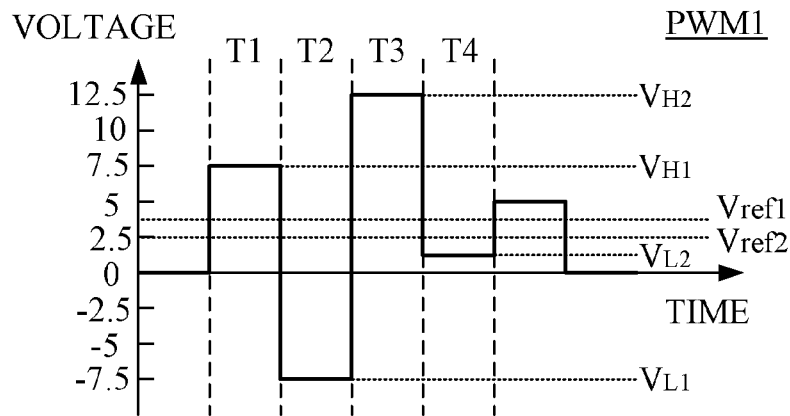
FIG. 2A is a waveform diagram of an original pulse width modulation (PWM) signal according to an embodiment of the present invention.
Figure 2B:
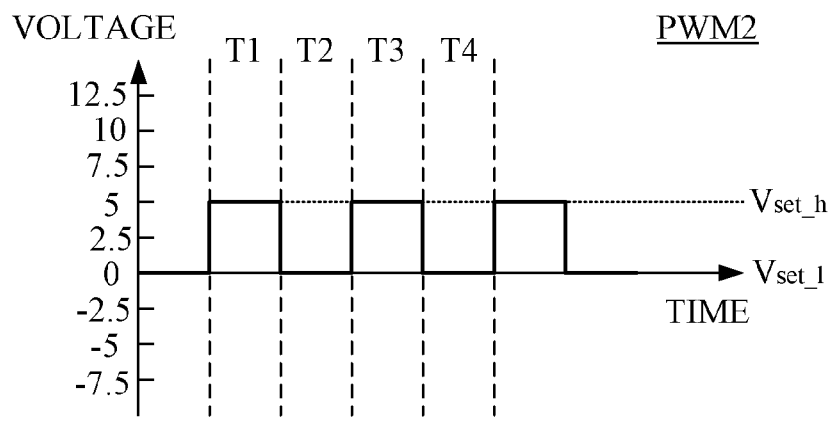
FIG. 2B is a waveform diagram of an output PWM signal after being shifted by a level-shifting unit according to an embodiment of the present invention.

FIG. 2A is a waveform diagram of the original PWM signal PWM1 according to an embodiment of the present invention. FIG. 2B is a waveform diagram of the output PWM signal PWM2 after being shifted by the level-shifting unit 10 according to an embodiment of the present invention.

In FIG. 2A, the levels of the original PWM signal PWM1 in time durations T1, T2, T3 and T4 are $V_{H1}$, $V_{L1}$, $V_{H2}$ and $V_{L2}$ respectively. The level-shifting unit 10 compares $V_{H1}$, $V_{L1}$, $V_{H2}$ and $V_{L2}$ with the first reference value Vref1 and the second reference value Vref2 in time durations T1, T2, T3 and T4 respectively. In an embodiment of the present invention, $V_{H1}$, $V_{L1}$, $V_{H2}$ and $V_{L2}$ can be, for instance, 7.5 volts (V), −7.5V, 12.5V and 1.25V respectively, and the first reference value Vref1 and the second reference value Vref2 can be 3.75V and 2.5V respectively.

In the time duration T1, as shown in FIG. 2A, the high level $V_{H1}$ (7.5V) of the original PWM signal PWM1 is larger than the first reference value Vref1 (3.75V). Hence, as shown in FIG. 2B, the level-shifting unit 10 shifts the output PWM signal PWM2 to output the set high level Vset_h in the time duration T1. In an embodiment of the present invention, the set high level Vset_h can be, for instance, 5V.

In the time duration T2, as shown in FIG. 2A, the low level $V_{L1}$ (−7.5V) of the original PWM signal PWM1 is lower than the second reference value Vref2 (2.5V). Hence, as shown in FIG. 2B, the level-shifting unit 10 shifts the output PWM signal PWM2 to output the set low level Vset_l in the time duration T2. In an embodiment of the present invention, the set low level Vset_l can be, for instance, 0V.

Similarly, in the time duration T3 as shown in FIG. 2A, the high level $V_{H2}$ (12.5V) of the original PWM signal PWM1 is larger than the first reference value Vref1 (3.75V). As shown in FIG. 2B, the level-shifting unit 10 shifts the output PWM signal PWM2 to output the set high level Vset_h of 5V in the time duration T3.

In the time duration T4 as shown in FIG. 2A, the low level $V_{L2}$ (1.25V) of the original PWM signal PWM1 is lower than the second reference value Vref2 (2.5V). As shown in FIG. 2B, the level-shifting unit 10 shifts the output PWM signal PWM2 to output the set low level Vset_l of 0V in the time duration T4.

The high/low levels of the original PWM signal PWM1 may not be recognized by the control unit 14 due to process variations or design factors. However, the high/low levels of the original PWM signal PWM1 can be shifted by the level-shifting unit 10 of the motor control system 1 to generate the output PWM signal PWM2 having the high/low levels that are recognizable by the control unit 14.

The original PWM signal PWM1 and the output PWM signal PWM2 in FIGS. 2A and 2B are only exemplary. In an embodiment of the present invention, the waveforms of the output PWM signal PWM2 and the original PWM signal PWM1 are not completely in-phase. A slight phase difference may be generated due to the delay caused by the processing of the level-shifting unit 10. Further, the waveforms of the original PWM signal PWM1 and the output PWM signal PWM2 may be in-phase, or may have invert phases, depending on the design of the phase-shifting unit 10. In different embodiments, each voltage level can be adjusted according to practical needs and is not limited by the values mentioned above. For instance, the set low level Vset_l can be designed to be a negative voltage.

Figure 3:
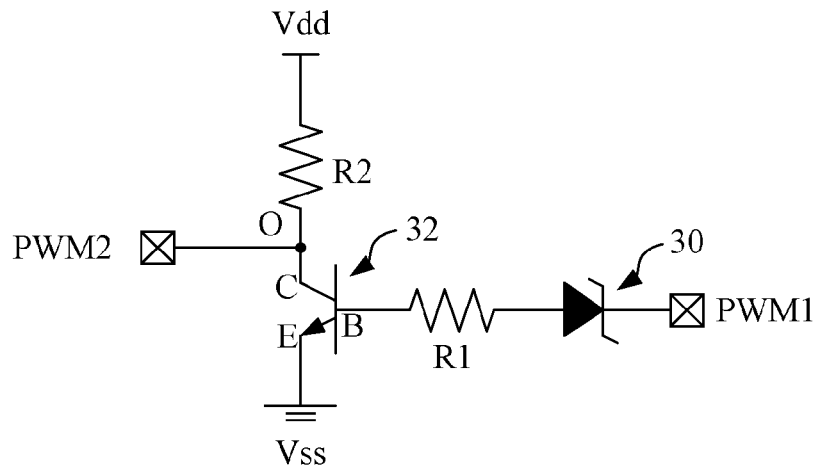
FIG. 3 is a detailed circuit diagram illustrating the level-shifting unit according to an embodiment of the present invention.

FIG. 3 is a detailed circuit diagram illustrating the level-shifting unit 10 according to an embodiment of the present invention. In the present embodiment, the level-shifting unit 10 includes a Zener diode 30 and a switch transistor 32.

The Zener diode 30 includes an anode and a cathode. The cathode receives the original PWM signal PWM1. In the present embodiment, the switch transistor 32 is an N-P-N bipolar junction transistor (BJT), which includes a voltage control terminal B (base), a first terminal C (collector) and a second terminal E (emitter).

The voltage control terminal B is electrically connected to the anode of the Zener diode 30. The first terminal C is electrically connected to a first voltage source Vdd having the set high level and an output terminal O that generates the output PWM signal PWM2. The second terminal E is electrically connected to a second voltage source Vss having the set low level. In the present embodiment, the voltage control terminal B is electrically connected to the anode of the Zener diode 30 via a load R1. The first terminal C is electrically connected to the first voltage source Vdd via a load R2.

In the present embodiment, the first reference value Vref1 is a sum of a first forward voltage Vth1 of the Zener diode 30 and a second forward voltage Vth2 of the switch transistor 32, i.e., Vref1=Vth1+Vth2. The second reference value Vref2 is the first forward voltage Vth1. The forward voltage of the Zener diode 30 is the breakdown voltage for the Zener diode 30 to operate in the breakdown region. For instance, if the first forward voltage Vth1 of the Zener diode 30 is 4V and the second forward voltage Vth2 of the switch transistor 32 is 1V, the first reference value Vref1 is 5V and the second reference value Vref2 is 4V.

When a high level, such as 7V, of the original PWM signal PWM1 is larger than the first reference value Vref1, the Zener diode 30 and the switch transistor 32 are turned on. A voltage level of the output terminal O is then dropped to a voltage level of the second voltage source Vss, which is equivalent to the set low level, due to the presence of the forward current. On the other hand, when a low level, such as 3V, of the original PWM signal PWM1 is lower than the second reference value Vref2, the Zener diode 30 cannot be turned on. Consequently, the switch transistor 32 is turned off. The output terminal O then receives the voltage level of the first voltage source Vdd, and outputs the set high level.

Therefore, in the operation of the level-shifting unit 10 of the present embodiment, when a high level of the original PWM signal PWM1 is larger than the first reference value Vref1, the output PWM signal PWM2 outputs the set low level, and when a low level of the original PWM signal PWM1 is lower than the second reference value Vref2, the output PWM signal PWM2 outputs the set high level. Hence, the output PWM signal PWM2 and the original PWM signal PWM1 have invert phases.

The circuit illustrated in FIG. 3 is only exemplary and is not limited thereto. For example, other load components such as resistors or capacitors can be implemented in different embodiments for stabilizing the circuit voltage. Forward voltages of the Zener diode 30 and the switch transistor 32, as well as voltage values of the first voltage source Vdd and the second voltage source Vss can all be adjusted by using suitable components according to practical needs to thereby realize different reference values and set levels.

In the embodiment as shown in FIG. 3, the switch transistor 32 is an N-P-N BJT. In other embodiments, the switch transistor 32 can also be a P-N-P BJT, or a metal-oxide-semiconductor field-effect transistor (MOSFET) paired with a Zener diode to accomplish the level-shifting mechanism.

Figure 4:
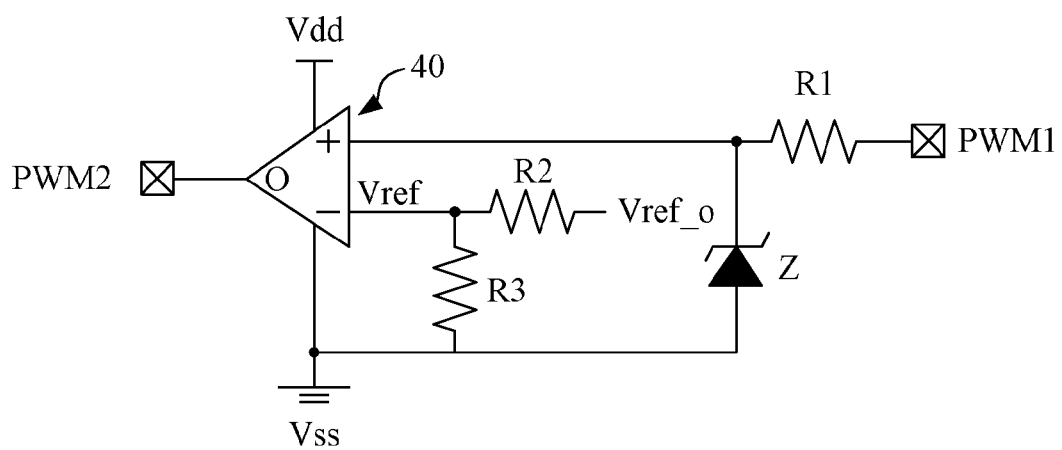
FIG. 4 is a detailed circuit diagram illustrating the level-shifting unit according to another embodiment of the present invention.

FIG. 4 is a detailed circuit diagram illustrating the level-shifting unit 10 according to another embodiment of the present invention. In the present invention, the level-shifting unit 10 includes a comparator 40.

In an embodiment, the comparator 40 is implemented by an operational amplifier. The comparator 40 is electrically connected to the first voltage source Vdd having the set high level and the second voltage source Vss having the set low level. The comparator 40 compares the original PWM signal PWM1 with a voltage Vref having the first reference value and the second reference value.

In the present embodiment, a positive input terminal (+) of the comparator 40 receives the original PWM signal PWM1 through a load R1, and a negative input terminal (−) of the comparator 40 receives the voltage Vref. The voltage Vref can be obtained by dividing an original voltage Vref_o via loads R2 and R3. A Zener diode Z, electrically connected to the positive input terminal and the load R1, clamps the voltage so as to prevent the components from being damaged or malfunctioning due to excessive voltage.

In one embodiment, the first reference value and the second reference value can both be set to the voltage Vref to perform comparison with the original PWM signal PWM1. In an embodiment, a first reference value and a second reference value different from the first reference value are generated from the voltage Vref due to a tolerance of the comparator 40. Therefore, when the original PWM signal PWM1 is larger than the first reference value, the comparator 40 generates the output PWM signal PWM2 having the set high level at the output terminal O according to the first voltage source Vdd. When the original PWM signal PWM1 is lower than the second reference value, the comparator 40 generates the output PWM signal PWM2 having the set low level at the output terminal O according to the second voltage source Vss.

Therefore, in the operation of the level-shifting unit 10 of the present embodiment, when a high level of the original PWM signal PWM1 is larger than the first reference value Vref1, the output PWM signal PWM2 outputs the set high level, and when a low level of the original PWM signal PWM1 is lower than the second reference value Vref2, the output PWM signal PWM2 outputs the set low level. Hence the output PWM signal PWM2 and the original PWM signal PWM1 are in-phase.

The circuit illustrated in FIG. 4 is only an example. Other loads such as various kinds of resistors or capacitors can be used to stabilize the circuit voltage in different embodiments. The values of the voltage Vref, and the first reference value and the second reference value generated due to the component tolerance can all be adjusted with suitable components according to practical needs to thereby realize different reference values and set levels.

Figure 5:
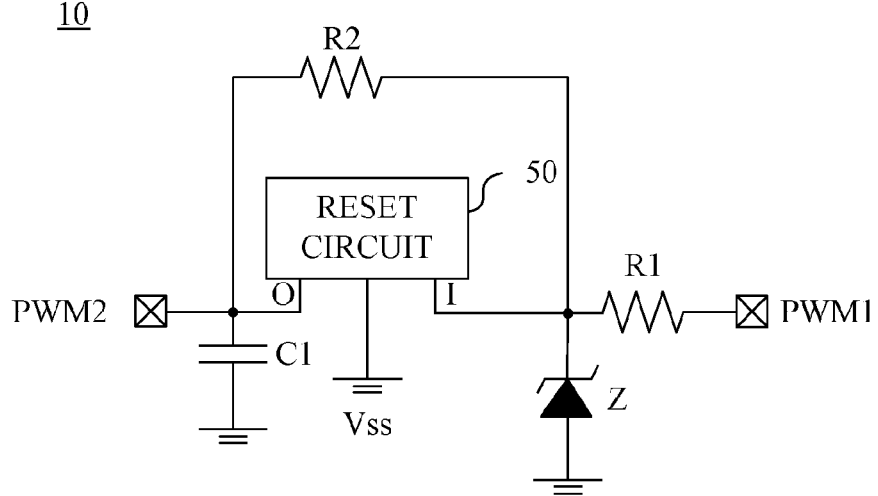
FIG. 5 is a detailed circuit diagram illustrating the level-shifting unit according to another embodiment of the present invention.

FIG. 5 is a detailed circuit diagram illustrating the level-shifting unit 10 according to another embodiment of the present invention. In the present embodiment, the level-shifting unit 10 includes a reset circuit 50.

The reset circuit 50 can be implemented by various circuits and is not limited to a particular circuit. In the present embodiment, the reset circuit 50 receives the original PWM signal PWM1 at an input terminal I via a load R1. A Zener diode Z electrically connected to the load R1 clamps the voltage so as to prevent the components from being damaged or malfunctioning due to excessive voltage. A load R2 and a capacitor C1 are disposed for filtering and regulating purposes.

Appropriate values of a first reference value and a second reference can be set in the reset circuit 50 to determine whether to perform a signal resetting mechanism. When the original PWM signal PWM1 is larger than the first reference value, the reset circuit 50 bypasses the original PWM signal PWM1 such that the original PWM signal PWM 1 is outputted to an output terminal O. When the original PWM signal PWM1 is lower than the second reference value, the reset circuit 50 generates a low reset level at the output terminal O. The output PWM signal PWM2 can be generated directly by the reset circuit 50. A high level of the original PWM signal PWM1 bypassed by the reset circuit 50 can be the set high level of the output PWM signal PWM2. The low reset level can be a set low level of the output PWM signal PWM2.

The level-shifting unit 10 in the present embodiment is different from those of the previous embodiments in that the level-shifting unit 10 in the present embodiment cannot dynamically adjust the set high level. The high level of the original PWM signal PWM1 has to meet the requirement of the control unit 14 such that the output PWM signal PWM2 generated by the level-shifting unit 10 meets the requirement of the control unit 14.

Therefore, in the operation of the level-shifting unit 10 of the present embodiment, when a high level of the original PWM signal PWM1 is larger than the first reference value Vref1, the output PWM signal PWM2 outputs the set high level. When a low level of the original PWM signal PWM1 is lower than the second reference value Vref2, the output PWM signal PWM2 outputs the set low level. Hence the output PWM signal PWM2 and the original PWM signal PWM1 are in-phase.

The circuit illustrated in FIG. 5 is only an example. Other loads such as various kinds of resistors or capacitors can be used to stabilize the circuit voltage in different embodiments. The values of the first reference value and the second reference value generated due to the component tolerance can all be adjusted with suitable components according to practical needs to thereby realize different reference values and set levels.

Figure 6:
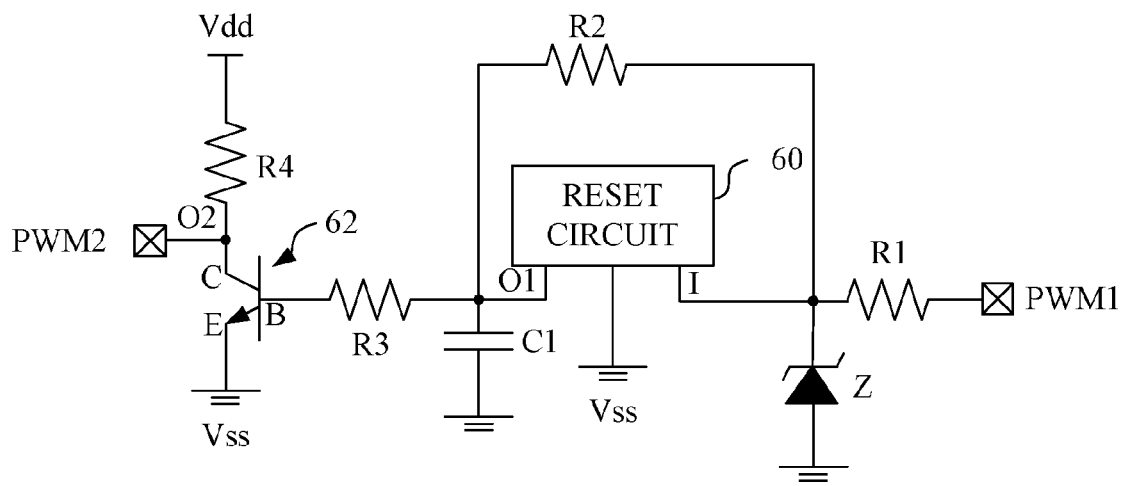
FIG. 6 is a detailed circuit diagram illustrating the level-shifting unit according to another embodiment of the present invention.

FIG. 6 is a detailed circuit diagram illustrating the level-shifting unit 10 according to another embodiment of the present invention. In the present invention, the level-shifting unit 10 includes a reset circuit 60 and a switch transistor 62. The reset circuit 60 is similar to the reset circuit 50 shown in FIG. 5 and the switch transistor 62 is similar to the switch transistor 32 in shown in FIG. 3. Therefore, the details of these components are not discussed herein.

In the present embodiment, the reset circuit 60 receives the original PWM signal PWM1 at an output terminal O1 via a load R1. The output terminal O1 of the reset circuit 60 is electrically connected to a voltage control terminal B of the switch transistor 62 via a load R3. A first terminal C of the switch transistor 62 serves as an output terminal O2 to generate the output PWM signal PWM2.

Therefore, when the original PWM signal PWM1 is larger than the first reference value, the reset circuit 60 bypasses the original PWM signal PWM1 such that the original PWM signal PWM1 is outputted to the output terminal O1. When the switch transistor 62 is further turned on according to the high level of the original PWM signal PWM1, a voltage level of the output terminal O2 is decreased to the voltage level of the second voltage source Vss, which is the set low level, due to the presence of the forward current. On the other hand, when the original PWM signal PWM1 is lower than the second reference value, the reset circuit 60 generates a low reset level at the output terminal O1. At this time, when the low reset level is unable to turn on the switch transistor 62, the output terminal O2 receives the voltage level of the first voltage source Vdd and outputs the set high level.

Therefore, in the operation of the level-shifting unit 10 of the present embodiment, when a high level of the original PWM signal PWM1 is larger than the first reference value Vref1, the output PWM signal PWM2 outputs the set low level. When a low level of the original PWM signal PWM1 is lower than the second reference value Vref2, the output PWM signal PWM2 outputs the set high level. Hence the output PWM signal PWM2 and the original PWM signal PWM1 have invert phases.

The circuit illustrated in FIG. 6 is only an example. Other loads such as various kinds of resistors or capacitors can be used to stabilize the circuit voltage in different embodiments. The values of the first reference value and the second reference value generated due to the component tolerance can all be adjusted with suitable components according to practical needs to thereby realize different reference values and set levels.

Figure 7:
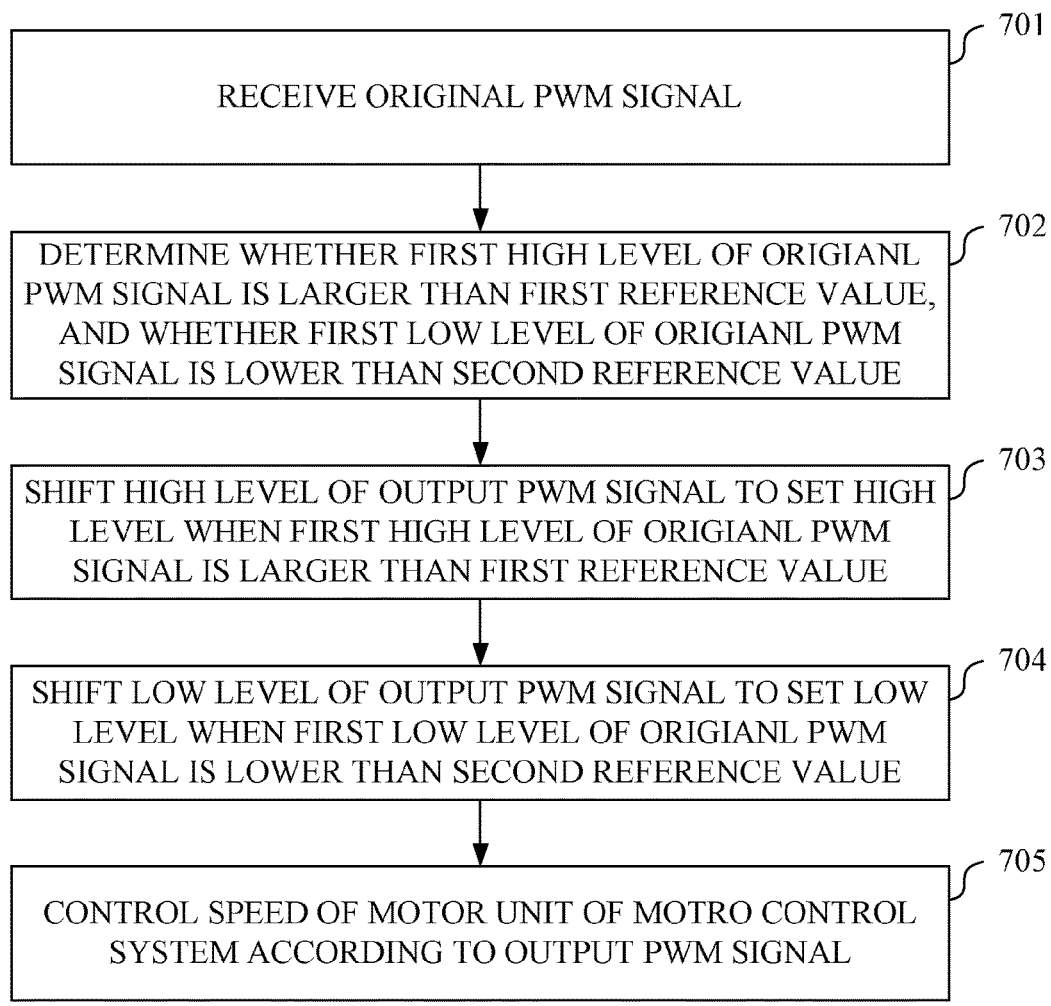
FIG. 7 is a flow chart illustrating a motor control method according to an embodiment of the present invention.

FIG. 7 is a flow chart illustrating a motor control method 700 according to an embodiment of the present invention. The motor control method 700 can be used in the motor control system 1 as shown in FIG. 1. The motor control method 700 includes the steps outlined below. The steps are not recited in the sequence in which the steps are performed. That is, unless the sequence of the steps is expressly indicated, the sequence of the steps is interchangeable, and all or part of the steps may be simultaneously, partially simultaneously, or sequentially performed.

In step 701, the level-shifting unit 10 receives an original PWM signal PWM1.

In step 702, the level-shifting unit 10 determines whether a first high level of the original PWM signal PWM1 is larger than a first reference value, and whether a first low level of the original PWM signal PWM1 is lower than a second reference value.

In step 703, the level-shifting unit 10 shifts a high level of an output PWM signal PWM2 to a set high level when the high level of the original PWM signal PWM1 is larger than the first reference value.

In step 704, the level-shifting unit 10 shifts a low level of the output PWM signal PWM2 to a set low level when the low level of the original PWM signal PWM1 is lower than the second reference value.

In step 705, the control unit 14 controls a speed of the motor unit 12 of the motor control system 1 according to the output PWM signal PWM2.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A motor control system, comprising:
a level-shifting unit for receiving an original pulse width modulation (PWM) signal to generate an output PWM signal, wherein the level-shifting unit shifts a second high level of the output PWM signal to a set high level when a first high level of the original PWM signal is larger than a first reference value, and shifts a second low level of the output PWM signal to a set low level when a first low level of the original PWM signal is lower than a second reference value, and the level-shifting unit comprises:
a Zener diode, comprising an anode and a cathode, wherein the cathode receives the original PWM signal; and
a switch transistor, comprising:
a voltage control terminal electrically connected to the anode:
a first terminal electrically connected to a first voltage source having the set high level and an output terminal, wherein the output terminal generates the output PWM signal; and
a second terminal electrically connected to a second voltage source having the set low level;
a motor unit; and
a control unit for controlling a speed of the motor unit according to the output PWM signal.

2. The motor control system of claim 1, wherein the first reference value is a sum of a first forward voltage of the Zener diode and a second forward voltage of the switch transistor, the second reference value is the first forward voltage, the Zener diode and the switch transistor are turned on to output the set low level at the output terminal when the first high level of the original PWM signal is larger than the first reference value, and the switch transistor is turned off to output the set high level at the output terminal when the first low level of the original PWM signal is lower than the second reference value.

3. The motor control system of claim 1, wherein the original PWM signal and the output PWM signal have invert phases.

4. A motor control system, comprising:
a level-shifting unit for receiving an original pulse width modulation (PWM) signal to generate an output PWM signal, wherein the level-shifting unit shifts a second high level of the output PWM signal to a set high level when a first high level of the original PWM signal is larger than a first reference value, and shifts a second low level of the output PWM signal to a set low level when a first low level of the original PWM signal is lower than a second reference value, and the level-shifting unit comprises:
a reset circuit for receiving the original PWM signal, so as to bypass the original PWM signal when the original PWM signal is larger than the first reference value, and generate a low reset level when the original PWM signal is lower than the second reference value; and
a switch transistor, comprising:
a voltage control terminal electrically connected to the reset circuit;
a first terminal electrically connected to a first voltage source having the set high level and an output terminal, wherein the output terminal generates the output PWM signal; and
a second terminal electrically connected to a second voltage source having the set low level;
a motor unit; and
a control unit for controlling a speed of the motor unit according to the output PWM signal.

5. The motor control system of claim 4, wherein the reset circuit outputs the output PWM signal directly, the first high level of the bypassed original PWM signal is the set high level of the output PWM signal, and the low reset level is the set low level of the output PWM signal.

6. The motor control system of claim 4, wherein the switch transistor is turned on for the output terminal to output the set low level when the reset circuit bypasses the original PWM signal, and the switch transistor is turned off for the output terminal to output the set high level when the reset circuit generates the low reset level.

7. The motor control system of claim 6, wherein the original PWM signal and the output PWM signal have invert phases.

8. A motor control method for a motor control system, the motor control method comprising:
receiving an original pulse width modulation (PWM) signal;
determining whether a first high level of the original PWM signal is larger than a first reference value, and whether a first low level of the original PWM signal is lower than a second reference value;
generating an output PWM signal, wherein a first high level of the output PWM signal is shifted to a set high level when a first high level of the original PWM signal is larger than the first reference value, and a second low level of the output PWM signal is shifted to a set low level when the first low level of the original PWM signal is lower than the second reference value;
controlling a speed of a motor unit of the motor control system according to the output PWM signal;
receiving the original PWM signal by a Zener diode, wherein the Zener diode is electrically connected to a switch transistor, and the switch transistor is electrically connected to a first voltage source having the set high level and a second voltage source having the set low level;
turning on the Zener diode and the switch transistor such that an output terminal of the switch transistor is electrically connected to the second voltage source and the output PWM signal having the set low level is outputted by the switch transistor when the first high level of the original PWM signal is larger than a sum of a first forward voltage of the Zener diode and a second forward voltage of the switch transistor; and
turning off the switch transistor such that the output terminal receives a voltage of the first voltage source and the switch transistor outputs the output PWM signal having the set high level when the first low level of the original PWM signal is lower than the first forward voltage of the Zener diode.

9. The motor control method of claim 8, wherein the original PWM signal and the output PWM signal have invert phases.

10. A motor control method for a motor control system, the motor control method comprising:
receiving an original pulse width modulation (PWM) signal;
determining whether a first high level of the original PWM signal is larger than a first reference value, and whether a first low level of the original PWM signal is lower than a second reference value;
generating an output PWM signal, wherein a first high level of the output PWM signal is shifted to a set high level when a first high level of the original PWM signal is larger than the first reference value, and a second low level of the output PWM signal is shifted to a set low level when the first low level of the original PWM signal is lower than the second reference value;
controlling a speed of a motor unit of the motor control system according to the output PWM signal;
receiving the original PWM signal by a reset circuit, wherein the reset circuit is electrically connected to a switch transistor, and the switch transistor is electrically connected to a first voltage source having the set high level and a second voltage source having the set low level;
bypassing the original PWM signal by the reset circuit when the original PWM signal is larger than the first reference value;
generating a low reset level by the reset circuit when the original PWM signal is lower than the second reference value;
turning on the switch transistor such that an output terminal of the switch transistor is electrically connected to the second voltage source and the switch transistor outputs the output PWM signal having the set low level when the reset circuit bypasses the original PWM signal; and
turning off the switch transistor such that the output terminal receives a voltage of the first voltage source, and the switch transistor outputs the output PWM signal having the set high level when the reset circuit generates the low reset level.

11. The motor control method of claim 10, wherein the reset circuit outputs the output PWM signal directly, the first high level of the bypassed original PWM signal is the set high level of the output PWM signal, and the low reset level is the set low level of the output PWM signal.

12. The motor control method of claim 10, wherein the original PWM signal and the output PWM signal have invert phases.

\* \* \* \* \*